(12) United States Patent
Saito et al.

(10) Patent No.: US 11,884,041 B2
(45) Date of Patent: Jan. 30, 2024

(54) METHOD FOR PREPARING MULTI-LAYER OPTICAL LAMINATES

(71) Applicant: 3M INNOVATIVE PROPERTIES COMPANY, St. Paul, MN (US)

(72) Inventors: Kazuta Saito, Tokyo (JP); Katsuya Takamori, Kanagawa (JP)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

(21) Appl. No.: 17/844,408

(22) Filed: Jun. 20, 2022

(65) Prior Publication Data

US 2022/0324203 A1    Oct. 13, 2022

Related U.S. Application Data

(62) Division of application No. 15/733,078, filed as application No. PCT/IB2018/060389 on Dec. 19, 2018, now Pat. No. 11,396,161.

(Continued)

(51) Int. Cl.
*B32B 17/10* (2006.01)
*B32B 7/12* (2006.01)
(Continued)

(52) U.S. Cl.
CPC ........ *B32B 17/10045* (2013.01); *B29C 48/02* (2019.02); *B32B 7/12* (2013.01);
(Continued)

(58) Field of Classification Search
CPC ....... B29C 48/71; B29C 65/18; B29C 65/486; B29C 65/7841; B29C 65/7465; B29C 65/73366; B29C 48/21; B29C 66/73366; B29C 66/7465; B29L 17/10036; B29L 17/10045; B29L 17/10128;
(Continued)

(56) References Cited

U.S. PATENT DOCUMENTS 5,233,465 A   8/1993  Wheatley et al.
RE34,605 E   5/1994  Schrenk et al.
(Continued)

FOREIGN PATENT DOCUMENTS

JP   H07-205374    8/1995
JP   1998-017339   1/1998
(Continued)

OTHER PUBLICATIONS

PCT International Search Report from PCT/IB2018/060389 dated Apr. 26, 2019, 4 pages.

*Primary Examiner* — Philip C Tucker
*Assistant Examiner* — Brian R Slawski
(74) *Attorney, Agent, or Firm* — Jonathan L. Tolstedt

(57) ABSTRACT

Methods for preparing multi-layer optical laminates include placing an optical film that is free form an adhesive layer between first and second glass substrates that are free of an adhesive layer, placing this laminate under vacuum, and then heating the laminate under pressure to a temperature above the softening temperature of the optical film. The glass substrates are free of an adhesive layer but may include a silane surface treatment. The resulting multi-layer laminate is optically clear and does not show scattering of reflected light by the optical film.

6 Claims, 3 Drawing Sheets

Related U.S. Application Data

(60) Provisional application No. 62/611,110, filed on Dec. 28, 2017.

(51) Int. Cl.
| | |
|---|---|
| *B32B 37/10* | (2006.01) |
| *B29C 48/21* | (2019.01) |
| *C03C 17/30* | (2006.01) |
| *B32B 37/00* | (2006.01) |
| *B29L 9/00* | (2006.01) |
| *B32B 37/24* | (2006.01) |
| *B29C 65/00* | (2006.01) |
| *B29C 65/18* | (2006.01) |
| *B29C 48/02* | (2019.01) |

(52) U.S. Cl.
CPC .. *B32B 17/10128* (2013.01); *B32B 17/10458* (2013.01); *B32B 17/10779* (2013.01); *B32B 17/10834* (2013.01); *B32B 17/10871* (2013.01); *B32B 17/10972* (2013.01); *B32B 37/0007* (2013.01); *B32B 37/1009* (2013.01); *C03C 17/30* (2013.01); *B29C 65/18* (2013.01); *B29C 66/73366* (2013.01); *B29C 66/7465* (2013.01); *B29L 2009/00* (2013.01); *B32B 2037/0092* (2013.01); *B32B 2037/243* (2013.01); *B32B 2250/05* (2013.01); *B32B 2250/42* (2013.01); *B32B 2309/02* (2013.01); *B32B 2309/68* (2013.01); *B32B 2315/08* (2013.01); *B32B 2367/00* (2013.01); *B32B 2605/006* (2013.01)

(58) Field of Classification Search
CPC ......... B29L 17/10458; B29L 17/10779; B29L 17/10834; B29L 17/10871; B29L 17/10972; B29L 2037/0092; B29L 2037/243; B29L 2250/05; B29L 2250/42; B29L 2309/02; B29L 2309/68; B29L 2315/08; B29L 2367/00; B29L 2605/006; B29L 37/0007; B29L 37/1009; B29L 7/12; B29L 2009/00; C03C 17/30; B32B 17/10036

USPC .......... 156/60, 99, 103, 104, 106, 285, 286, 156/308.2, 309.6, 381, 382, 563, 583.1, 156/324.4; 428/98, 411.1, 430

See application file for complete search history.

(56) References Cited

U.S. PATENT DOCUMENTS

| | | |
|---|---|---|
| 5,360,659 A | 11/1994 | Arends et al. |
| 5,579,162 A | 11/1996 | Bjornard et al. |
| 5,882,774 A | 3/1999 | Jonza et al. |
| 6,049,419 A | 4/2000 | Wheatley et al. |
| 2004/0187437 A1 | 9/2004 | Stark |
| 2007/0034317 A1 | 2/2007 | Sklyarevich et al. |
| 2010/0157426 A1 | 6/2010 | Matsunami et al. |
| 2010/0285310 A1 | 11/2010 | Izurani et al. |
| 2011/0070451 A1* | 3/2011 | Khanna ............ B32B 17/10045 428/428 |
| 2011/0097572 A1* | 4/2011 | Yonekura .......... B32B 17/10036 156/104 |
| 2011/0165425 A1* | 7/2011 | Futamura ......... B32B 17/10697 526/273 |
| 2011/0287229 A1* | 11/2011 | Sakamoto ........ B32B 17/10449 428/174 |
| 2014/0220286 A1 | 8/2014 | Honeycutt et al. |

FOREIGN PATENT DOCUMENTS

| | | |
|---|---|---|
| JP | 2016088813 A | 5/2016 |
| WO | WO 2009/087868 | 7/2009 |
| WO | WO 2014/030698 | 2/2014 |

\* cited by examiner

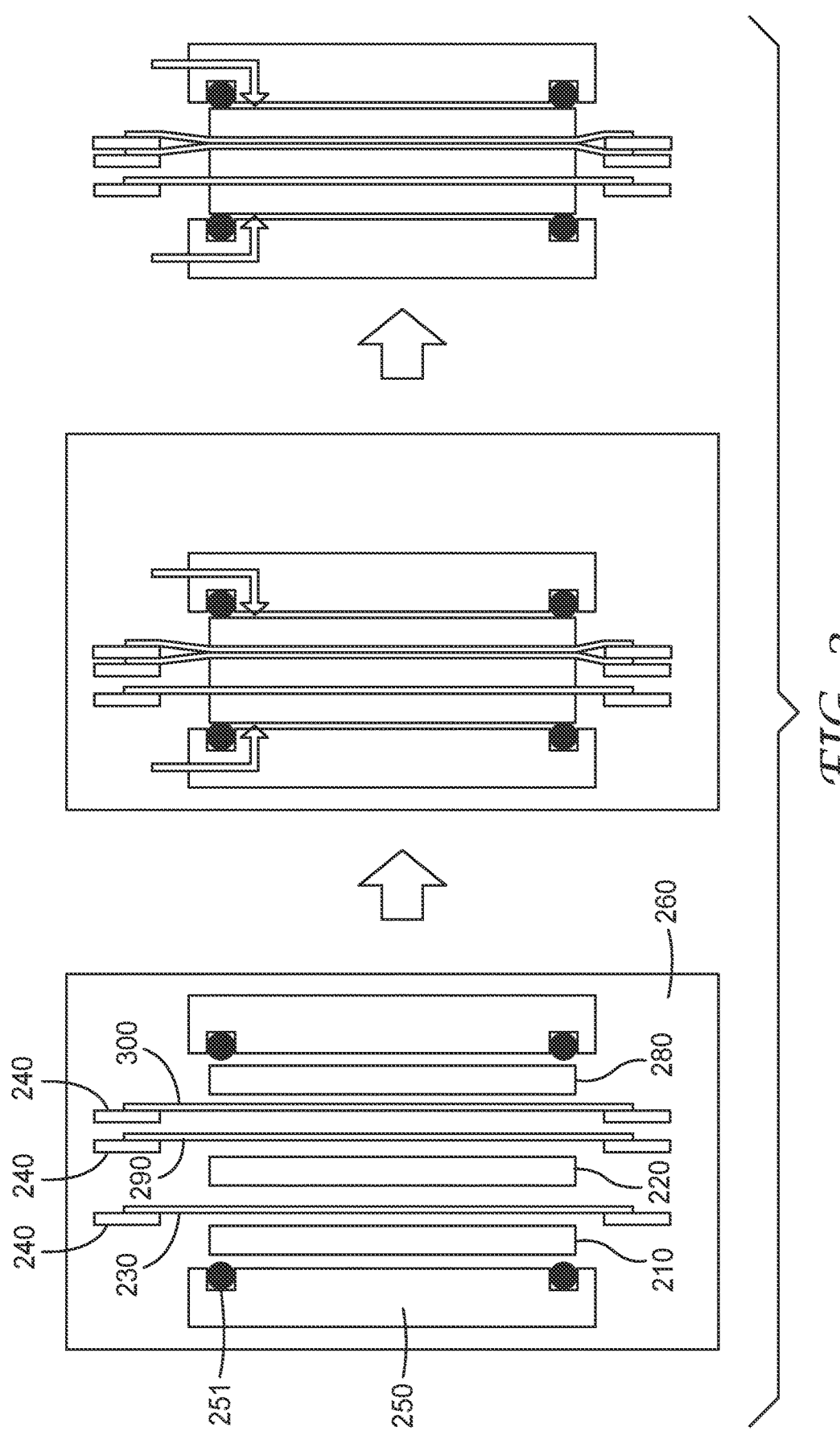

METHOD FOR PREPARING MULTI-LAYER OPTICAL LAMINATES

CROSS REFERENCE TO RELATED APPLICATION

This application is a divisional filing of U.S. application Ser. No. 15/733,078, filed May 12, 2020, now U.S. Pat. No. 11,396,161, which is a national stage filing under 35 C.F.R. 371 of PCT/IB2018/060389, filed Dec. 19, 2018, which claims the benefit of U.S. Provisional Application No. 62/611,110, filed Dec. 28, 2017, the disclosures of which are incorporated by reference in their entireties herein.

FIELD OF THE DISCLOSURE

This disclosure relates to methods for preparing multi-layer optical laminates, and optical laminates.

BACKGROUND

Multi-layer optical laminates are optical constructions that include three or more material layers adhered together. These optical laminates may be articles, meaning that they are used as they are, or they may be combined with other layers or constructions to form articles. The laminates can take a wide variety of shapes and forms. In some instances, the multi-layer optical laminates, may contain a combination of relatively rigid or semi-rigid layers such as glass or polymeric plates and flexible layers such as films. A wide variety of methods can be used to adhere together the layers, often adhesive layers are used.

An example of a multi-layer optical laminate is the safety glass that is typically used in the windshields of automobiles. In order to prevent the glass windshield from shattering, generally the safety glass construction is a multi-layer article with two layers of glass and an optically clear film sandwiched between the two layers of glass. Frequently the film is adhered to the glass by a heat activated adhesive layer such as polyvinyl butyral (PVB). PVB is particularly suitable as it is optically clear and is not tacky at room temperature, allowing it to be handled as a free-standing film at room temperature, but upon heating it becomes tacky and bonds strongly to both the glass and the film. Typically the safety glass laminates of glass/PVB/film/PVB/glass are prepared and placed in an autoclave and subjected to heat and pressure to form the laminate article. A variation on this process is described in US Patent Publication No. 2010/0285310 (Izurani et al.) which describes making a plastic film-inserted laminated glass, by first making a laminated film by thermocompression bonding and laminating the laminated film between curved glass plates.

SUMMARY

Disclosed herein are methods of preparing multi-layer optical laminates and multi-layer optical laminates. In some embodiments the method of preparing a laminate article comprises providing a first glass substrate with a first major surface and a second major surface, wherein the second major surface is free from an adhesive layer; providing a second glass substrate with a first major surface and a second major surface, wherein the first major surface is free from an adhesive layer; providing a first optical film with a first major surface and a second major surface comprising one or more layers of polymeric material and wherein the first major surface and the second major surface are free from an adhesive layer; preparing a multi-layer construction by arranging the first glass substrate, the first optical film, and the second glass substrate such that the second major surface of the first glass substrate is proximate to the first major surface of the first optical film, and the second major surface of the first optical film is proximate to the first major surface of the second glass substrate; placing the multi-layer construction in a vacuum chamber; applying a vacuum to the vacuum chamber containing the multi-layer construction, such that the second major surface of the first glass substrate is in direct surface contact with the first major surface of the first optical film and the first major surface of the second glass substrate is in direct surface contact with the second major surface of the first optical film; releasing the vacuum from the vacuum chamber; removing the multi-layer construction from the vacuum chamber and place the multi-layer construction in a device capable of supplying heat and/or pressure; raising and holding the temperature of the device capable of supplying heat and/or pressure to a temperature at or above the softening temperature of the polymeric material of the first and second major surfaces of the first optical film while applying a pressure of greater than atmospheric pressure to the multi-layer construction; decreasing the temperature of the device capable of supplying heat and/or pressure to room temperature; and releasing the pressure of greater than atmospheric pressure to the multi-layer construction, to form a multi-layer article that is optically clear and does not show scattering of reflected light by the first optical film.

In other embodiments, the method of preparing a laminate article comprises providing a first glass substrate with a first major surface and a second major surface, wherein the second major surface is a treated surface that is free from an adhesive layer; providing a second glass substrate with a first major surface and a second major surface, wherein the first major surface is a treated surface that is free from an adhesive layer; providing a first optical film with a first major surface and a second major surface comprising one or more layers of polymeric material and wherein the first major surface and the second major surface are free from an adhesive layer; preparing a multi-layer construction by arranging the first glass substrate, the first optical film, and the second glass substrate such that the second major surface of the first glass substrate is proximate to the first major surface of the first optical film, and the second major surface of the first optical film is proximate to the first major surface of the second glass substrate; placing the multi-layer construction in a vacuum chamber; applying a vacuum to the vacuum chamber containing the multi-layer construction, such that the second major surface of the first glass substrate is in direct surface contact with the first major surface of the first optical film and the first major surface of the second glass substrate is in direct surface contact with the second major surface of the first optical film; releasing the vacuum from the vacuum chamber; removing the multi-layer construction from the vacuum chamber and place the multi-layer construction in a device capable of supplying heat and/or pressure; raising and holding the temperature of the device capable of supplying heat and/or pressure to a temperature at or above the softening temperature of the polymeric material of the first and second major surfaces of the first optical film while applying a pressure of greater than atmospheric pressure to the multi-layer construction; decreasing the temperature of the device capable of supplying heat and/or pressure to room temperature; and releasing the pressure of greater than atmospheric pressure to the multi-layer construction, to form a multi-layer article that is optically clear and does not show scattering of reflected light by the first optical film.

Also disclosed are multi-layer articles. In some embodiments, the multi-layer article comprises a first glass substrate with a first major surface and a second major surface; a second glass substrate with a first major surface and a second major surface; and a first optical film with a first major surface and a second major surface comprising one or more layers of polymeric material, wherein the second major surface of the first glass substrate is interfacially bonded to the first major surface of the first optical film, wherein the interfacial bond is free from an adhesive layer, and wherein the second major surface of the first optical film is interfacially bonded with the first major surface of the second glass substrate, wherein the interfacial bond is free from an adhesive layer, and wherein the second major surface to the first glass substrate and the first major surface of the second glass substrate is a treated or untreated surface, wherein the treated surface comprises a silane coupling agent-treated surface, and wherein the multi-layer article is optically clear and does not show scattering of reflected light by the first optical film.

BRIEF DESCRIPTION OF THE DRAWINGS

The present application may be more completely understood in consideration of the following detailed description of various embodiments of the disclosure in connection with the accompanying drawings.

FIG. 3 is a cross sectional view of yet another embodiment of a method of the present disclosure.

Figure 1:
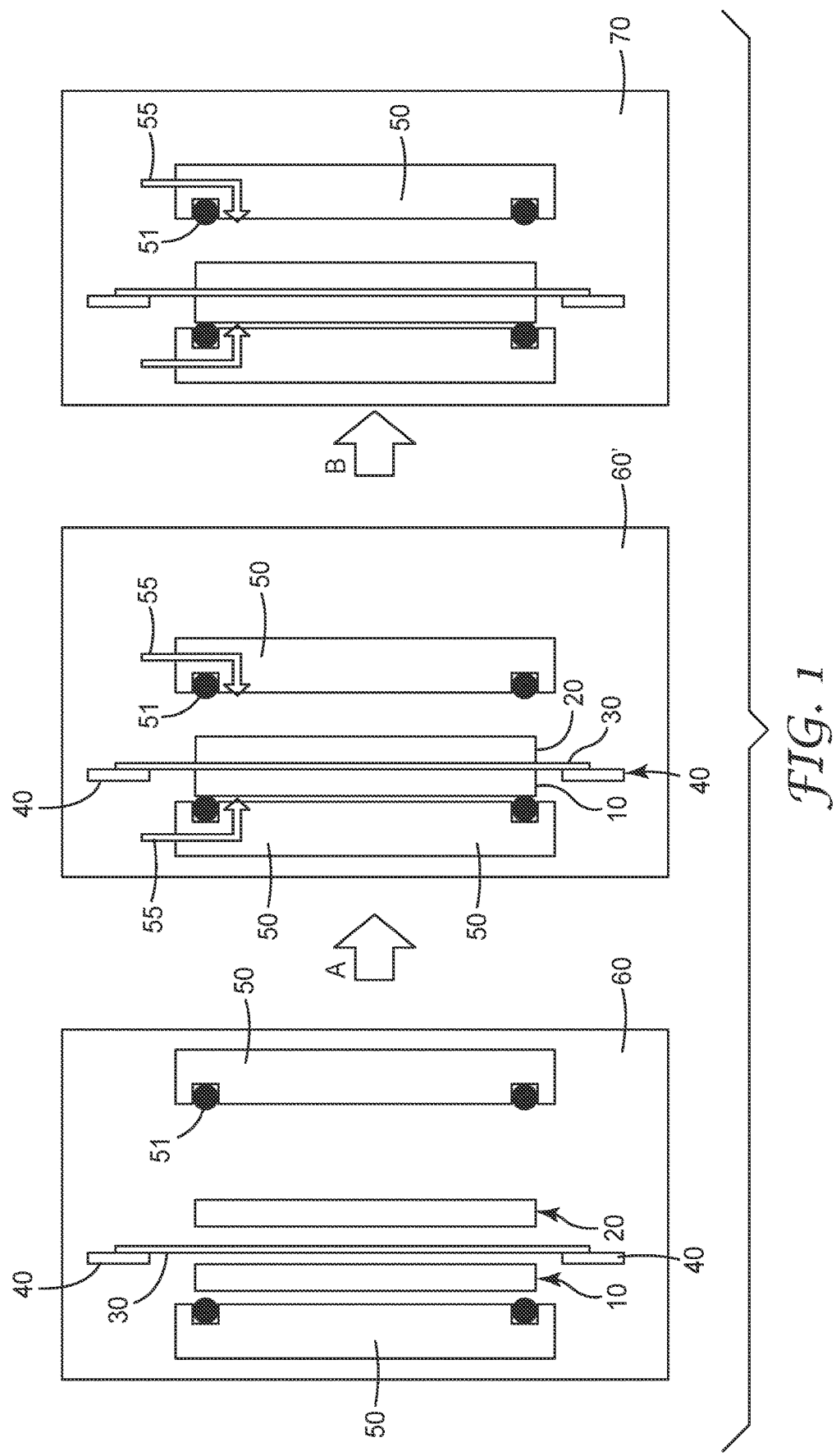
FIG. 1 is a cross sectional view of an embodiment of a method of the present disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Multi-layer optical laminates are optical constructions that include three or more material layers adhered together. These optical laminates may be articles, meaning that they are used as they are, or they may be combined with other layers or constructions to form articles. The laminates can take a wide variety of shapes and forms. In some instances, the multi-layer optical laminates, may contain a combination of relatively rigid or semi-rigid layers such as glass or polymeric plates and flexible layers such as films. A wide variety of methods can be used to adhere together the layers, often adhesive layers are used.

As more and more complex multi-layer optical laminates are developed and used, the requirements for these laminates have become more stringent. Not only do the laminates have structural limitations, namely they cannot delaminate or otherwise structurally fail, but also they have must have high optical transparency and this transparency must remain through a variety of conditions, in other words they must not develop optical defects. The development of optical defects, such as bubbles, local delamination, cloudiness and discoloration in laminated glass are unwanted phenomena that negatively affect the visual quality of a laminate but do not affect its structural safety. These defects can arise due to numerous influences during the production of a laminate and/or can be triggered during its lifetime.

Many of these defects can be dealt with through the use of adhesive layers. However, one defect in optical laminates that can be created by the use of adhesive layers is the phenomenon described as "orange peel". Many disciplines use the term orange peel defect to describe a variety of different circumstances, such as a roughened surface of a metal sheet on an automobile, or the roughened surface of a lens that has been improperly ground. In the field of optical laminates it has a somewhat different, but related, meaning. One useful description of the orange peel defect in optical laminates is presented in paragraph [0008] of US Patent Publication No. 2014/0220286 (Honeycutt et al.). This paragraph describes the circumstance where a PET (polyethylene terephthalate) film is laminated between glass plates through the use of polyvinyl butyral (PVB). The description states: "An additional problem associated with a laminate comprising a PET layer between two PVB sheets is the formation of another type of optical distortion referred to as waviness or orange peel. When PET is laminated between two layers of PVB, the PET does not "flow" like the PVB does, so it may look wavy or appear to have a surface that looks like applesauce when laminated, even if there is excellent deairing of the laminate." In some instances, the orange peel effect may not appear as a visual defect noticeable to the naked eye, but when light passes through the laminate, the exiting light can have a non-smooth surface. This can be observed by observing the reflected image of a straight body, such as a fluorescent tube, from the laminate. Whereas the reflection of the straight body light should have a smooth surface, in instances demonstrating orange peel, the surface of the reflection of straight body light has a textured or wavy surface. Therefore it is desirable to have multi-layer laminates that show low or No scattering of reflected light by films contained in the laminate construction.

The present disclosure provides methods for preparing multi-layer optical laminates that are free from defects such as orange peel, by not utilizing adhesive layers to laminate films between optical substrates such as glass. In the present disclosure, films are laminated directly to glass and the films serve to adhere the optical substrates together without generating optical defects such as orange peel.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

As used herein, the term "adjacent" refers to two layers that are proximate to another layer. Layers that are adjacent may be in direct contact with each other, or there may be an intervening layer. There is no empty space between layers that are adjacent.

The terms "room temperature" and "ambient temperature" are used interchangeably and have their conventional meaning, that is to say refer to temperature of 20-25° C.

Unless otherwise indicated, "optically transparent" refers to a layer, film, or article that has a high light transmittance over at least a portion of the visible light spectrum (about 400 to about 700 nm). Typically optically transparent layers, films, or articles have a luminous transmission of at least 90%.

Unless otherwise indicated, "optically clear" refers to an layer, film, or article that has a high light transmittance over at least a portion of the visible light spectrum (about 400 to about 700 nm), and that exhibits low haze. Typically optically clear layers, films, or articles have visible light transmittance values of at least 90%, often at least 95%, and haze values of 5% or less, often 2% or less. Luminous transmission and haze can be measured using techniques such as are described in ASTM D1003-11.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "aralkylene" refers to a divalent group of formula —$R^a$—$Ar^a$— where $R^a$ is an alkylene and $Ar^a$ is an arylene (i.e., an alkylene is bonded to an arylene).

The term "alkoxy" refers to a monovalent group of formula —O—R, where R is an alkyl group.

Disclosed herein are methods of preparing a laminate articles. These methods comprise forming a multi-layer construction, placing the multi-layer construction in a vacuum chamber, applying a vacuum to the vacuum chamber containing the multi-layer construction, releasing the vacuum from the vacuum chamber, removing the multi-layer construction from the vacuum chamber and placing the multi-layer construction in a device capable of supplying heat and/or pressure, raising and holding the temperature while applying a pressure of greater than atmospheric pressure to the multi-layer construction, and later decreasing the temperature and releasing the pressure to form a multi-layer article that is optically clear.

The multi-layer construction is prepared by providing a first glass substrate with a first major surface and a second major surface, where the second major surface is free from an adhesive layer, providing a second glass substrate with a first major surface and a second major surface, where the first major surface is free from an adhesive layer, and providing a first optical film with a first major surface and a second major surface where the first major surface and the second major surface are free from an adhesive layer. The first optical film comprises one or more layers of polymeric material. The multi-layer construction is prepared by arranging the first glass substrate, the first optical film, and the second glass substrate such that the second major surface of the first glass substrate is proximate to the first major surface of the first optical film, and the second major surface of the first optical film is proximate to the first major surface of the second glass substrate. Upon removal of the multi-layer construction from the vacuum chamber, the second major surface of the first glass substrate is in direct surface contact with the first major surface of the first optical film and the first major surface of the second glass substrate is in direct surface contact with the second major surface of the first optical film.

When the multi-layer construction is placed in a device capable of supplying heat and/or pressure, the temperature is raised and held at or above the softening temperature of the polymeric material of the first and second major surfaces of the first optical film. If the polymeric material of the first and second major surfaces of the first optical film comprise different materials, the temperature is raised and held at or above the higher softening temperature of the different materials.

The multi-layer construction may be assembled in a variety of ways prior to being placed in the vacuum chamber. In some embodiments, preparing the multi-layer construction comprises placing the first and second glass substrates and the first optical film in a frame wherein the frame comprises first and second plates such that the first plate is in contact with the first major surface of the first glass substrate and the second plate is in contact with second major surface of the second glass substrate. In some of these embodiments, each plate contains at least one orifice, where the orifice is connected to a source of compressed air pressure and wherein the orifice in the first plate is in fluid contact with the first glass substrate and the orifice in the second plate is in fluid contact with the second glass substrate, such that applying a pressure of greater than atmospheric pressure to the multi-layer construction comprises applying compressed air pressure through the orifices in the first and second plates.

A wide variety of glass substrates are suitable. The glass substrates are of sufficient thickness to make them rigid substrates and are optically clear. The thickness of the glass substrates depends upon a variety of factors such as the desired total thickness of the formed multi-layer article.

Typically it is desirable that the formed multi-layer article have a thickness of no more than 2.5 millimeters.

A wide variety of optical films are suitable for use in the methods of this disclosure. As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible, ultraviolet, or infrared regions of the electromagnetic spectrum). Exemplary optical films include, but are not limited to, visible mirror films, color mirror films, solar reflective films, infrared reflective films, ultraviolet reflective films, brightness enhancement films, reflective polarizer films such as dual brightness enhancement films, absorptive polarizer films, optically clear films, tinted films, and antireflective films.

Some optical films have multiple layers such as multiple layers of polymer-containing materials (e.g., polymers with or without dyes) or multiple layers of metal-containing material and polymeric materials. Some optical films have alternating layers of polymeric material with different indexes of refraction. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.); and U.S. Pat. No. 5,360,659 (Arends et al.).

In some particularly suitable embodiments, the first optical film comprises a multi-layer polarizing film. A wide variety of such films are suitable. Among the suitable multi-layer polarizing films are ones comprising alternating layers of polyethylene terephthalate and poly ethylene-naphthalate.

A wide variety of temperatures and pressures can be used to the multi-layer optical laminates of this disclosure. In some embodiments, it may be desirable to raise and hold the temperature of the device capable of supplying heat and/or pressure to a temperature of at least 120° C. for at least 30 minutes. In other embodiments, it may be desirable to raise and hold the temperature of the device capable of supplying heat and/or pressure to a temperature of at least 150° C. for at least 1 hour. A wide range of pressures are also suitable. In some specific embodiments, the pressure is at least 5 Kg/cm$^2$.

In some embodiments, the method further comprises providing a third glass substrate with a first major surface and second major surface, where the first major surface of the third glass substrate is free from an adhesive layer, providing a second optical film with a first major surface and a second major surface, where the first major surface and the second major surface are free from an adhesive layer. In these embodiments, preparing the multi-layer construction further comprises arranging the second optical film and the third glass substrate such that the first major surface of the second optical film is proximate to the second major surface of the second glass substrate and the second major surface of the second optical film is proximate to the first major surface of the third glass substrate. The second optical film, like the first optical film comprises one or more layers of polymeric material. The first optical film and the second optical film may be the same, but typically they are different films. If the polymeric material of the first and second optical films comprise different materials, the temperature is raised and held at or above the higher softening temperature of the different materials.

In other embodiments, the method further comprises providing a third glass substrate with a first major surface and second major surface, where the first major surface of the third glass substrate is free from an adhesive layer, providing a second optical film with a first major surface and a second major surface, where the first major surface and the second major surface are free from an adhesive layer, providing a third optical film with a first major surface and a second major surface, where the first major surface and the second major surface are free from an adhesive layer.

In these embodiments, preparing the multi-layer construction further comprises arranging the second optical film, the third optical film, and the third glass substrate such that the first major surface of the second optical film is proximate to the second major surface of the second glass substrate, the first major surface of the third optical film is proximate to the second major surface of the second optical film, and the second major surface of the third optical film is proximate to the first major surface of the third glass substrate. The second and third optical films, like the first optical film comprise one or more layers of polymeric material. The first, second, and third optical film may be the same, but typically they are different films. If the polymeric material of the optical films comprise different materials, the temperature is raised and held at or above the higher softening temperature of the different materials.

In the embodiments that include additional films and glass substrates, the overall methodology remains the same. In these embodiments, the multi-layer construction is prepared and process in the same way as described above.

Also disclosed herein are methods of preparing laminate articles where one or more of the surfaces of the glass substrates involved in forming the laminate are treated surfaces. The treated surfaces are still free of adhesive layers. A variety of surface treatments are suitable for forming the treated surfaces.

The methods are similar to the methods described above. These methods comprise forming a multi-layer construction, placing the multi-layer construction in a vacuum chamber, applying a vacuum to the vacuum chamber containing the multi-layer construction, releasing the vacuum from the vacuum chamber, removing the multi-layer construction from the vacuum chamber and placing the multi-layer construction in a device capable of supplying heat and/or pressure, raising and holding the temperature while applying a pressure of greater than atmospheric pressure to the multi-layer construction, and later decreasing the temperature and releasing the pressure to form a multi-layer article that is optically clear.

The multi-layer construction is prepared by providing a first glass substrate with a first major surface and a second major surface, where he second major surface is a treated surface that is free from an adhesive layer, providing a second glass substrate with a first major surface and a second major surface, where the first major surface is a treated surface that is free from an adhesive layer, and providing a first optical film with a first major surface and a second major surface where the first major surface and the second major surface are free from an adhesive layer. The first optical film comprises one or more layers of polymeric material. The multi-layer construction is prepared by arranging the first glass substrate, the first optical film, and the second glass substrate such that the second major surface of the first glass substrate is proximate to the first major surface of the first optical film, and the second major surface of the first optical film is proximate to the first major surface of the second glass substrate.

Upon removal of the multi-layer construction from the vacuum chamber, the second major surface of the first glass substrate is in direct surface contact with the first major surface of the first optical film and the first major surface of the second glass substrate is in direct surface contact with the second major surface of the first optical film.

When the multi-layer construction is placed in a device capable of supplying heat and/or pressure, the temperature is raised and held at or above the softening temperature of the polymeric material of the first and second major surfaces of the first optical film. If the polymeric material of the first and second major surfaces of the first optical film comprise different materials, the temperature is raised and held at or above the higher softening temperature of the different materials.

The multi-layer construction may be assembled in a variety of ways prior to being placed in the vacuum chamber. In some embodiments, preparing the multi-layer construction comprises placing the first and second glass substrates and the first optical film in a frame wherein the frame comprises first and second plates such that the first plate is in contact with the first major surface of the first glass substrate and the second plate is in contact with second major surface of the second glass substrate. In some of these embodiments, each plate contains at least one orifice, where the orifice is connected to a source of compressed air pressure and wherein the orifice in the first plate is in fluid contact with the first glass substrate and the orifice in the second plate is in fluid contact with the second glass substrate, such that applying a pressure of greater than atmospheric pressure to the multi-layer construction comprises applying compressed air pressure through the orifices in the first and second plates.

A wide variety of glass substrates are suitable. The glass substrates are of sufficient thickness to make them rigid substrates and are optically clear. The thickness of the glass substrates depends upon a variety of factors such as the desired total thickness of the formed multi-layer article. Typically it is desirable that the formed multi-layer article have a thickness of no more than 2.5 millimeters.

In some particularly suitable embodiments, the first optical film comprises a multi-layer polarizing film. A wide variety of such films are suitable. Among the suitable multi-layer polarizing films are ones comprising alternating layers of polyethylene terephthalate and polyethylene-naphthalate.

A wide variety of temperatures and pressures can be used to the multi-layer optical laminates of this disclosure. In some embodiments, it may be desirable to raise and hold the temperature of the device capable of supplying heat and/or pressure to a temperature of at least 120° C. for at least 30 minutes. In other embodiments, it may be desirable to raise and hold the temperature of the device capable of supplying heat and/or pressure to a temperature of at least 150° C. for at least 1 hour. A wide range of pressures are also suitable. In some specific embodiments, the pressure is at least 5 Kg/cm$^2$.

In some embodiments, the method further comprises providing a third glass substrate with a first major surface and second major surface, where the first major surface of the third glass substrate is a treated surface that is free from an adhesive layer, providing a second optical film with a first major surface and a second major surface, where the first major surface and the second major surface are free from an adhesive layer. In these embodiments, preparing the multi-layer construction further comprises arranging the second optical film and the third glass substrate such that the first major surface of the second optical film is proximate to the second major surface of the second glass substrate and the second major surface of the second optical film is proximate to the first major surface of the third glass substrate. The second optical film, like the first optical film comprises one or more layers of polymeric material. The first optical film and the second optical film may be the same, but typically they are different films. If the polymeric material of the first and second optical films comprise different materials, the temperature is raised and held at or above the higher softening temperature of the different materials.

In other embodiments, the method further comprises providing a third glass substrate with a first major surface and second major surface, where the first major surface of the third glass substrate is a treated surface that is free from an adhesive layer, providing a second optical film with a first major surface and a second major surface, where the first major surface and the second major surface are free from an adhesive layer, providing a third optical film with a first major surface and a second major surface, where the first major surface and the second major surface are free from an adhesive layer. In these embodiments, preparing the multi-layer construction further comprises arranging the second optical film, the third optical film, and the third glass substrate such that the first major surface of the second optical film is proximate to the second major surface of the second glass substrate, the first major surface of the third optical film is proximate to the second major surface of the second optical film, and the second major surface of the third optical film is proximate to the first major surface of the third glass substrate. The second and third optical films, like the first optical film comprise one or more layers of polymeric material. The first, second, and third optical film may be the same, but typically they are different films. If the polymeric material of the optical films comprise different materials, the temperature is raised and held at or above the higher softening temperature of the different materials.

In the embodiments that include additional films and glass substrates, the overall methodology remains the same. In these embodiments, the multi-layer construction is prepared and process in the same way as described above.

A wide variety of surface treatments are suitable in the methods of this disclosure. In some embodiments, the treated surface of the first, second, and third glass substrates are prepared by a treatment comprising providing a treatment solution, applying the treatment solution to the glass surface to form a continuous or discontinuous coating layer, and drying the continuous or discontinuous coating layer. The treatment solution comprises at least one silane coupling agent, and a solvent.

A wide variety of silane coupling agents are suitable. Particularly suitable silane coupling agents are those of the general structure: $Z_3Si-A-X$, where each Z is an alkyl or alkoxy group, with the proviso that at least one Z is an alkoxy group; A is a divalent linking group comprising an alkylene, arylene, or aralkylene group; and X is a functional group selected from: an amino group $-NR^1_2$ where each $R^1$ independently is a hydrogen atom, an alkyl group, or an aryl group; an isocyanate group; or an epoxy group.

A wide variety of solvents are suitable for preparing the treatment solution, provided the solvent is able to solubilize the silane coupling agent and is sufficiently volatile as to be readily removed by drying. Suitable solvents include: ketones such as acetone or MEK (methyl ethyl ketone);

aromatic liquids such as benzene or toluene; esters such as ethyl acetate; alkanes such as hexane or heptane; alcohols such a methanol, ethanol, or propanol; ethers such as ethyl ether or THF (tetrahydrofuran); or halogenated alkanes such a methylene chloride or carbon tetrachloride. Also disclosed are multi-layer articles that are prepared using the methods described above. In some embodiments, the multi-layer article comprises a first glass substrate with a first major surface and a second major surface, a second glass substrate with a first major surface and a second major surface, and a first optical film with a first major surface and a second major surface comprising one or more layers of polymeric material, wherein the second major surface of the first glass substrate is interfacially bonded to the first major surface of the first optical film, wherein the interfacial bond is free from an adhesive layer, and wherein the second major surface of the first optical film is interfacially bonded with the first major surface of the second glass substrate, wherein the interfacial bond is free from an adhesive layer, and wherein the second major surface to the first glass substrate and the first major surface of the second glass substrate is a treated or untreated surface, wherein the treated surface comprises a silane coupling agent-treated surface, and wherein the multi-layer article is optically clear.

In other embodiments, the multi-layer article further comprises a second optical film with a first major surface and a second major surface, and a third glass substrate with a first major surface and a second major surface, where the second major surface of the second glass substrate is interfacially bonded to the first major surface of the second optical film, wherein the interfacial bond is free from an adhesive layer, and wherein the second major surface of the second optical film is interfacially bonded with the first major surface of the third glass substrate, where the interfacial bond is free from an adhesive layer, and wherein the second major surface of the second glass substrate and the first major surface of the third glass substrate is a treated or untreated surface, wherein the treated surface comprises a silane coupling agent-treated surface, and wherein the multi-layer article is optically clear and does not show scattering of reflected light by the first optical film.

In yet other embodiments, the multi-layer article further comprises a second optical film with a first major surface and a second major surface, a third optical film with a first major surface and a second major surface, and a third glass substrate with a first major surface and a second major surface, where the second major surface of the second glass substrate is interfacially bonded to the first major surface of the second optical film, wherein the interfacial bond is free from an adhesive layer, and where the second major surface of the second optical film is interfacially bonded with the first major surface of the third optical film, where the interfacial bond is free from an adhesive layer, and where the second major surface of the third optical film is interfacially bonded to the first major surface of the third glass substrate, where the second major surface of the second glass substrate and the first major surface of the third glass substrate is a treated or untreated surface, where the treated surface comprises a silane coupling agent-treated surface, and wherein the multi-layer article is optically clear and does not show scattering of reflected light by the optical films.

Suitable glass substrates, optical films, and surface treatments are described in detail above. In some embodiments, the first optical film comprises a multi-layer polarizing film. In some of these embodiments, the multi-layer polarizing film comprises alternating layers of polyethylene terephthalate and poly ethylene-naphthalate.

In embodiments where one or more of the glass substrates comprise a treated surface, the treated surface comprises a treated surface treated with a silane coupling agent with the general structure: $Z_3Si\text{-}A\text{-}X$, where each Z is an alkyl or alkoxy group, with the proviso that at least one Z is an alkoxy group; A is a divalent linking group comprising an alkylene, arylene, or aralkylene group; and X is a functional group selected from: an amino group —$NR'_2$ where each R' independently is a hydrogen atom, an alkyl group, or an aryl group; an isocyanate group; or an epoxy group.

The methods and articles of this disclosure can be further understood from the figures. FIG. 1 shows an embodiment of a method of this disclosure. In FIG. 1, assembled multi-layer construction comprises first glass substrate 10, second glass substrate 20, and optical film 30. Optical film 30 is held in place proximate to first glass substrate 10 and second glass substrate 20 by clips 40. The assembled multi-layer construction is located in vacuum chamber 60. Pressure plates 50 are located on either side of the assembled multi-layer construction. Pressure plates 50 have O-rings 51, and compressed air tubes 55. This construction is subjected to process step A, which is the application of a vacuum to the vacuum chamber 60 making the vacuum chamber 60'. First glass substrate 10, second glass substrate 20, and optical film 30 are in contact and are held together by pressure plates 50 by compressed air provided by air tubes 55, the compressed air pressure being maintained by O-rings 51. The optical film 30 is held by clips 40. The construction is subjected to process step B which involves release of the vacuum from vacuum chamber 60', removal of the multi-layer assembly from the vacuum chamber and placement in an oven 70, and heated to a temperature of at least 120° C., and then cooled to room temperature. First glass substrate 10, second glass substrate 20, and optical film 30 are in contact and are held together by pressure plates 50 by the compressed air provided by air tubes 55, the compressed air pressure being maintained by O-rings 51. The optical film 30 is held by clips 40.

Figure 2:
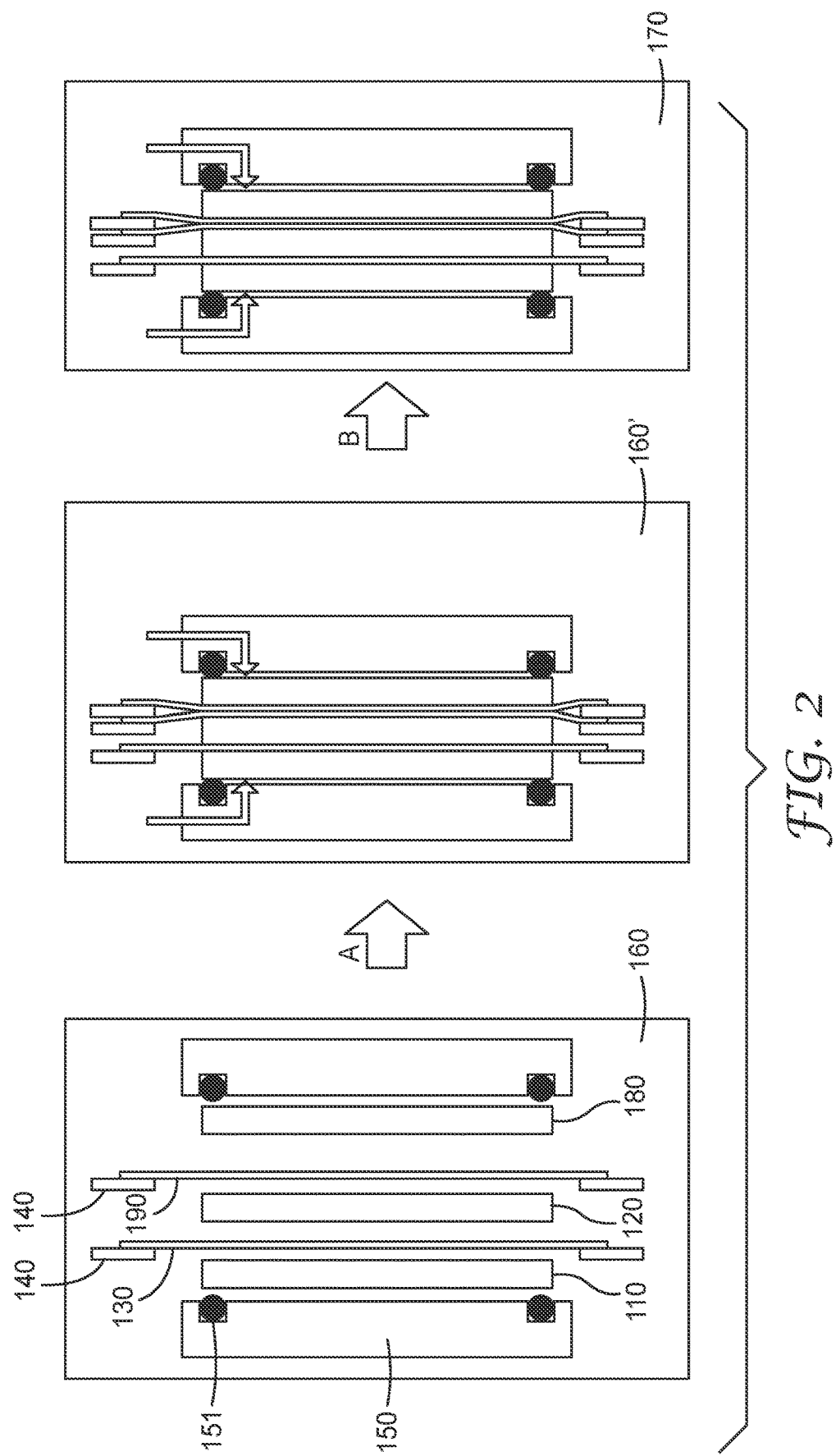
FIG. 2 is a cross sectional view of another embodiment of a method of the present disclosure.

FIG. 2 shows another embodiment of a method of this disclosure. In FIG. 2, assembled multi-layer construction comprises first glass substrate 110, second glass substrate 120, third glass substrate 180 and optical films 130 and 190. Optical film 130 is held in place proximate to first glass substrate 110 and second glass substrate 120 by clips 140, and optical film 190 is held in place proximate to second glass substrate 120 and third glass substrate 180 by clips 140. The assembled multi-layer construction is located in vacuum chamber 160. Pressure plates 150 are located on either side of the assembled multi-layer construction. Pressure plates 150 have O-rings 151, and compressed air tubes 155. This construction is subjected to process step A, which is the application of a vacuum to the vacuum chamber 160 making the vacuum chamber 160'. First glass substrate 110, optical film 130, second glass substrate 120, optical film 190, and third glass substrate 180 are in contact and are held together by pressure plates 150 by compressed air provided by air tubes 155, the compressed air pressure being maintained by O-rings 151. The optical films 130 and 190 are held by clips 140. The construction is subjected to process step B which involves release of the vacuum from vacuum chamber 160', removal of the multi-layer assembly from the vacuum chamber and placement in an oven 170, and heated to a temperature of at least 120° C., and then cooled to room temperature. First glass substrate 110, optical film 130, second glass substrate 120, optical film 190, and third glass substrate 180 are in contact and are held together by pressure plates 150 by compressed air provided by air tubes 155, the compressed air pressure being maintained by O-rings 151. The optical films 130 and 190 are held by clips 140.

FIG. 3 shows another embodiment of a method of this disclosure. In FIG. 3, assembled multi-layer construction comprises first glass substrate 210, second glass substrate 220, third glass substrate 280 and optical films 230, 290, and 300. Optical film 230 is held in place proximate to first glass substrate 210 and second glass substrate 220 by clips 240, and optical films 290 and 300 are held in place proximate to second glass substrate 220 and third glass substrate 280 by clips 240. The assembled multi-layer construction is located in vacuum chamber 260. Pressure plates 250 are located on either side of the assembled multi-layer construction. Pressure plates 250 have O-rings 251, and compressed air tubes 255. This construction is subjected to process step A, which is the application of a vacuum to the vacuum chamber 260 making the vacuum chamber 260'. First glass substrate 210, optical film 230, second glass substrate 220, optical film 290, optical film 300, and third glass substrate 280 are in contact and are held together by pressure plates 250 by compressed air provided by air tubes 255, the compressed air pressure being maintained by O-rings 251. The optical films 230, 290, and 300 are held by clips 240. The construction is subjected to process step B which involves release of the vacuum from vacuum chamber 260', removal of the multi-layer assembly from the vacuum chamber and placement in an oven 270, and heated to a temperature of at least 120° C., and then cooled to room temperature. First glass substrate 210, optical film 230, second glass substrate 220, optical film 290, optical film 300, and third glass substrate 280 are in contact and are held together by pressure plates 250 by compressed air provided by air tubes 255, the compressed air pressure being maintained by O-rings 251. The optical films 230, 290, and 300 are held by clips 240.

This disclosure includes the following embodiments:

Among the embodiments are methods of preparing laminate articles. Embodiment 1 includes a method of preparing a laminate article comprising: providing a first glass substrate with a first major surface and a second major surface, wherein the second major surface is free from an adhesive layer; providing a second glass substrate with a first major surface and a second major surface, wherein the first major surface is free from an adhesive layer; providing a first optical film with a first major surface and a second major surface comprising one or more layers of polymeric material and wherein the first major surface and the second major surface are free from an adhesive layer; preparing a multi-layer construction by arranging the first glass substrate, the first optical film, and the second glass substrate such that the second major surface of the first glass substrate is proximate to the first major surface of the first optical film, and the second major surface of the first optical film is proximate to the first major surface of the second glass substrate; placing the multi-layer construction in a vacuum chamber; applying a vacuum to the vacuum chamber containing the multi-layer construction, such that the second major surface of the first glass substrate is in direct surface contact with the first major surface of the first optical film and the first major surface of the second glass substrate is in direct surface contact with the second major surface of the first optical film; releasing the vacuum from the vacuum chamber; removing the multi-layer construction from the vacuum chamber and place the multi-layer construction in a device capable of supplying heat and/or pressure; raising and holding the temperature of the device capable of supplying heat and/or pressure to a temperature at or above the softening temperature of the polymeric material of the first and second major surfaces of the first optical film while applying a pressure of greater than atmospheric pressure to the multi-layer construction; decreasing the temperature of the device capable of supplying heat and/or pressure to room temperature; and releasing the pressure of greater than atmospheric pressure to the multi-layer construction, to form a multi-layer article that is optically clear and does not show scattering of reflected light by the first optical film.

Embodiment 2 is the method of embodiment 1, further comprising: providing a third glass substrate with a first major surface and second major surface, wherein the first major surface of the third glass substrate is free from an adhesive layer; providing a second optical film with a first major surface and a second major surface, comprising one or more layers of polymeric material and wherein the first major surface and the second major surface are free from an adhesive layer; and wherein preparing the multi-layer construction further comprises arranging the second optical film and the third glass substrate such that the first major surface of the second optical film is proximate to the second major surface of the second glass substrate and the second major surface of the second optical film is proximate to the first major surface of the third glass substrate.

Embodiment 3 is the method of embodiment, further comprising: providing a third glass substrate with a first major surface and second major surface, wherein the first major surface of the third glass substrate is free from an adhesive layer; providing a second optical film with a first major surface and a second major surface, comprising one or more layers of polymeric material and wherein the first major surface and the second major surface are free from an adhesive layer; providing a third optical film with a first major surface and a second major surface, comprising one or more layers of polymeric material and wherein the first major surface and the second major surface are free from an adhesive layer; and wherein preparing the multi-layer construction further comprises arranging the second optical film, the third optical film, and the third glass substrate such that the first major surface of the second optical film is proximate to the second major surface of the second glass substrate, the first major surface of the third optical film is proximate to the second major surface of the second optical film, and the second major surface of the third optical film is proximate to the first major surface of the third glass substrate.

Embodiment 4 is the method of any of embodiments 1-3, wherein preparing the multi-layer construction comprises placing the first and second glass substrates and the first optical film in a frame wherein the frame comprises first and second plates such that the first plate is in contact with the first major surface of the first glass substrate and the second plate is in contact with second major surface of the second glass substrate.

Embodiment 5 is the method of embodiment 4, wherein each plate contains at least one orifice, wherein the orifice is connected to a source of compressed air pressure and wherein the orifice in the first plate is in fluid contact with the first glass substrate and the orifice in the second plate is in fluid contact with the second glass substrate, such that applying a pressure of greater than atmospheric pressure to the multi-layer construction comprises applying compressed air pressure through the orifices in the first and second plates.

Embodiment 6 is the method of any of embodiments 1-5, wherein the first optical film comprises a multi-layer polarizing film.

Embodiment 7 is the method of embodiment 6, the multi-layer polarizing film comprises alternating layers of polyethylene terephthalate and polyethylene-naphthalate.

Embodiment 8 is the method of any of embodiments 1-7, wherein raising and holding the temperature of the device capable of supplying heat and/or pressure comprises raising the temperature to at least 120° C. for at least 30 minutes.

Embodiment 9 is the method of any of embodiments 1-8, wherein the pressure of the device capable of supplying heat and/or pressure is raised to at least 5 Kg/cm$^2$.

Embodiment 10 is a method of preparing a laminate article comprising: providing a first glass substrate with a first major surface and a second major surface, wherein the second major surface is a treated surface that is free from an adhesive layer; providing a second glass substrate with a first major surface and a second major surface, wherein the first major surface is a treated surface that is free from an adhesive layer; providing a first optical film with a first major surface and a second major surface comprising one or more layers of polymeric material and wherein the first major surface and the second major surface are free from an adhesive layer; preparing a multi-layer construction by arranging the first glass substrate, the first optical film, and the second glass substrate such that the second major surface of the first glass substrate is proximate to the first major surface of the first optical film, and the second major surface of the first optical film is proximate to the first major surface of the second glass substrate; placing the multi-layer construction in a vacuum chamber; applying a vacuum to the vacuum chamber containing the multi-layer construction, such that the second major surface of the first glass substrate is in direct surface contact with the first major surface of the first optical film and the first major surface of the second glass substrate is in direct surface contact with the second major surface of the first optical film; releasing the vacuum from the vacuum chamber; removing the multi-layer construction from the vacuum chamber and place the multi-layer construction in a device capable of supplying heat and/or pressure; raising and holding the temperature of the device capable of supplying heat and/or pressure to a temperature at or above the softening temperature of the polymeric material of the first and second major surfaces of the first optical film while applying a pressure of greater than atmospheric pressure to the multi-layer construction; decreasing the temperature of the device capable of supplying heat and/or pressure to room temperature; and releasing the pressure of greater than atmospheric pressure to the multi-layer construction, to form a multi-layer article that is optically clear and does not show scattering of reflected light by the first optical film.

Embodiment 11 is the method of embodiment 10, wherein the treated surface of the first glass substrate and the second glass substrate are prepared by a treatment comprising: providing a treatment solution comprising: at least one silane coupling agent; and a solvent; applying the treatment solution to the glass surface to form a continuous or discontinuous coating layer; and drying the continuous or discontinuous coating layer.

Embodiment 12 is the method of embodiment 11, wherein the silane coupling agent is of the general structure: $Z_3$Si-A-X wherein each Z is an alkyl or alkoxy group, with the proviso that at least one Z is an alkoxy group; A is a divalent linking group comprising an alkylene, arylene, or aralkylene group; and X is a functional group selected from an amino group —NR'$_2$ where each R' independently is a hydrogen atom, an alkyl group, or an aryl group; an isocyanate group; or an epoxy group.

Embodiment 13 is the method of any of embodiments 10-12, further comprising: providing a third glass substrate with a first major surface and second major surface, wherein the first major surface of the third glass substrate is a treated surface that is free from an adhesive layer; providing a second optical film with a first major surface and a second major surface, comprising one or more layers of polymeric material and wherein the first major surface and the second major surface are free from an adhesive layer; and wherein preparing the multi-layer construction further comprises arranging the second optical film and the third glass substrate such that the first major surface of the second optical film is proximate to the second major surface of the second glass substrate and the second major surface of the second optical film is proximate to the first major surface of the third glass substrate.

Embodiment 14 is the method of any of embodiments 10-12, further comprising: providing a third glass substrate with a first major surface and second major surface, wherein the first major surface of the third glass substrate is a treated surface that is free from an adhesive layer; providing a second optical film with a first major surface and a second major surface, comprising one or more layers of polymeric material and wherein the first major surface and the second major surface are free from an adhesive layer; providing a third optical film with a first major surface and a second major surface, comprising one or more layers of polymeric material and wherein the first major surface and the second major surface are free from an adhesive layer; and wherein preparing the multi-layer construction further comprises arranging the second optical film, the third optical film, and the third glass substrate such that the first major surface of the second optical film is proximate to the second major surface of the second glass substrate, the first major surface of the third optical film is proximate to the second major surface of the second optical film, and the second major surface of the third optical film is proximate to the first major surface of the third glass substrate.

Embodiment 15 is the method of any of embodiments 10-14, wherein preparing the multi-layer construction comprises placing the first and second glass substrates and the first optical film in a frame wherein the frame comprises first and second plates such that the first plate is in contact with the first major surface of the first glass substrate and the second plate is in contact with second major surface of the second glass substrate.

Embodiment 16 is the method of embodiment 15, wherein each plate contains at least one orifice, wherein the orifice is connected to a source of compressed air pressure and wherein the orifice in the first plate is in fluid contact with the first glass substrate and the orifice in the second plate is in fluid contact with the second glass substrate, such that applying a pressure of greater than atmospheric pressure to the multi-layer construction comprises applying compressed air pressure through the orifices in the first and second plates.

Embodiment 17 is the method of any of embodiments 10-16, wherein the first optical film comprises a multi-layer polarizing film.

Embodiment 18 is the method of embodiment 17, wherein the multi-layer polarizing film comprises alternating layers of polyethylene terephthalate and polyethylene-naphthalate.

Embodiment 19 is the method of any of embodiments 10-18, wherein raising and holding the temperature of the device capable of supplying heat and/or pressure comprises raising the temperature to at least 120° C. for at least 30 minutes.

Embodiment 20 is the method of any of embodiments 10-19, wherein the pressure of the device capable of supplying heat and/or pressure is raised to at least 5 Kg/cm$^2$.

Also disclosed are multi-layer articles. Embodiment 21 includes a multi-layer article comprising: a first glass substrate with a first major surface and a second major surface; a second glass substrate with a first major surface and a second major surface; and a first optical film with a first major surface and a second major surface comprising one or more layers of polymeric material, wherein the second major surface of the first glass substrate is interfacially bonded to the first major surface of the first optical film, wherein the interfacial bond is free from an adhesive layer, and wherein the second major surface of the first optical film is interfacially bonded with the first major surface of the second glass substrate, wherein the interfacial bond is free from an adhesive layer, and wherein the second major surface to the first glass substrate and the first major surface of the second glass substrate is a treated or untreated surface, wherein the treated surface comprises a silane coupling agent-treated surface, and wherein the multi-layer article is optically clear and does not show scattering of reflected light by the first optical film.

Embodiment 22 is the multi-layer article of embodiment 21, wherein the article further comprises: a second optical film with a first major surface and a second major surface; and a third glass substrate with a first major surface and a second major surface, wherein the second major surface of the second glass substrate is interfacially bonded to the first major surface of the second optical film, wherein the interfacial bond is free from an adhesive layer, and wherein the second major surface of the second optical film is interfacially bonded with the first major surface of the third glass substrate, wherein the interfacial bond is free from an adhesive layer, and wherein the second major surface of the second glass substrate and the first major surface of the third glass substrate is a treated or untreated surface, wherein the treated surface comprises a silane coupling agent-treated surface, and wherein the multi-layer article is optically clear and does not show scattering of reflected light by the optical films.

Embodiment 23 is the multi-layer article of embodiment 21, wherein the article further comprises: a second optical film with a first major surface and a second major surface; a third optical film with a first major surface and a second major surface; and a third glass substrate with a first major surface and a second major surface, wherein the second major surface of the second glass substrate is interfacially bonded to the first major surface of the second optical film, wherein the interfacial bond is free from an adhesive layer, and wherein the second major surface of the second optical film is interfacially bonded with the first major surface of the third optical film, wherein the interfacial bond is free from an adhesive layer, and wherein the second major surface of the third optical film is interfacially bonded to the first major surface of the third glass substrate, wherein the second major surface of the second glass substrate and the first major surface of the third glass substrate is a treated or untreated surface, wherein the treated surface comprises a silane coupling agent-treated surface, and wherein the multi-layer article is optically clear and does not show scattering of reflected light by the optical films.

Embodiment 24 is the multi-layer article of any of embodiments 21-23, wherein the first optical film comprises a multi-layer polarizing film.

Embodiment 25 is the multi-layer article of embodiment 24, wherein the multi-layer polarizing film comprises alternating layers of polyethylene terephthalate and polyethylene naphthalate.

Embodiment 26 is the multi-layer article of any of embodiments 21-25, wherein the second major surface of the first glass substrate and the first major surface of the second glass substrate comprises a treated surface, wherein the treated surface comprises a treated surface treated with a silane coupling agent with the general structure: $Z_3$Si-A-X wherein each Z is an alkyl or alkoxy group, with the proviso that at least one Z is an alkoxy group; A is a divalent linking group comprising an alkylene, arylene, or aralkylene group; and X is a functional group selected from an amino group —NR'$_2$ where each R' independently is a hydrogen atom, an alkyl group, or an aryl group; an isocyanate group; or an epoxy group.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wisconsin unless otherwise noted. The following abbreviations are used: mm=millimeters; Pa=Pascals; min=minutes; hr=hour; Kg=kilogram; cm=centimeter.

| Abbreviation or Trade Designation | Description |
| --- | --- |
| Glass Plate | AR glass plate with a diameter of 300 mm and a thickness of 0.7 mm commercially available from Schott as BOROFLOAT. |
| AP Film | A multilayer optical film reflective polarizer, commercially available from 3M Company as APF-T35. |
| PFS | "Polarizer Film Substrate", a glass plate as described above without the AR coating. |
| PF | Polarizer film commercially available from Sanritz Corporation as HLC2-5618. |
| Plate film | Film commercially available from Teijin as TEIJIN W142 QWP. |
| OCA | 3M OPTICALLY CLEAR ADHESIVE 8141 commercially available from 3M Company. |

Table of Abbreviations

Test Methods
Orange Peel Testing

Orange Peel testing was carried out by observing the reflected image generated when a straight body fluorescent tube was shone on the constructions described below. The presence or absence of Orange Peel was easily visibly perceived. The result of the test is reported as "Good" if no Orange Peel is observed or "NG" if Orange Peel is observed.

Bond Testing

Bonding testing refers to whether the bonding adhesion between layers is high enough to withstand the water jet cutting process. The data are presented as "Good" if no delamination occurs during the water jet cutting process; "Marginal" if the water jet cutting was successful but some delamination occurs during the water jet cutting process; or "NG" if the construction is unable to withstand water jet cutting.

Warpage Testing

Warpage refers to the flatness of the stack of with a diameter of 300 mm prior to water jet cutting as detected by visibly observation. The data are presented as "Good" if no warpage is observed; "Marginal" if some warpage is observed; or "NG" if the construction is highly warped.

Comparative Example C1

For Comparative Example C1, an OCA was used to bond the assembly such that the assembly has the sequence: Glass Plate/OCA/AP Film/OCA/PFS/OCA/PF/OCA/Plate film/OCA/Glass Plate.

The resultant construction failed the Orange Peel test (described above) and was not further tested.

Examples 1-2 and Comparative Example C2

For Examples 1-2 and Comparative Example C2, no OCA was used, and the differences are that for Examples 1 and 2, compressed air pressure (5 Kg/cm$^2$) was applied through inlets in the aluminum pressing plates against the two outer glass plates of the construction immediately before the vacuum in the vacuum chamber was broken. In Comparative Example C2 no compressed air pressure was applied. In Example 1 and Comparative Example C2, the stack was heated at a temperature of 150° C. for 1 hour, in Example 2 the stack was heated to a temperature of 100° C. for 1 hour. A summary of these conditions as well the results of Orange Peel, Bonding, and Warpage testing (described above) are presented in Table 1.

TABLE 1

| Example | Oven Conditions (° C. for 1 hr) | Compressed Air Pressure Applied (Kg/cm$^2$) | Orange Peel | Bonding | Warpage |
|---------|---------------------------------|---------------------------------------------|-------------|---------|---------|
| 1 | 150 | 5 | Good | Good | Marginal |
| 2 | 100 | 5 | Good | Marginal | Good |
| C2 | 150 | 0 | NG | NG | NA |

NA = Not Applicable

Examples 1-2 and Comparative Examples C1-C2

Examples of a flat lens optical article that includes a laminated stack of 3 glass plates and 3 optical films. In each case the formed optical article was 34 mm in diameter and about 2.5 mm thick. The articles were made by assembling and processing a laminate stack construction.

Generalized Assembly and Processing of Laminate Stack Construction:

For each article laminate stack assemblies were arranged in the sequence:
Glass Plate/AP Film/PFS/PF/Plate film/Glass Plate.

The general procedure for assembling and processing the laminate stack assemblies was as follows:

1) Each film was attached to an individual ring frame.
2) The glass plates and films with ring frames were placed in sequence in a vacuum chamber between two 30 mm thick aluminum pressing plates with O rings to seal the aluminum pressing plates against the glass plates, the entire construction being held together with bolts between the two aluminum pressing plates.
3) The vacuum chamber was pumped down to a pressure of 50 Pa and the layers of the assembly were pressed together with the pressing plates.
4) Break the vacuum and take out the stack with the pressing plates.
5) Put the stack all together into an air-circulating oven for 1 hr.
6) Take out the stack and allow to cool to room temperature.
7) Cut out the stack along glass edge.
8) Water jet to cut into final diameter (34 mm).

What is claimed is:

1. A multi-layer article comprising:
   a first glass substrate with a first major surface and a second major surface;
   a second glass substrate with a first major surface and a second major surface; and
   a first optical film with a first major surface and a second major surface comprising one or more layers of polymeric material, wherein the second major surface of the first glass substrate is interfacially bonded to the first major surface of the first optical film, wherein the interfacial bond between the first glass substrate and the first optical film is free from an adhesive layer, and wherein the second major surface of the first optical film is interfacially bonded with the first major surface of the second glass substrate, wherein the interfacial bond between the first optical film and the second glass substrate is free from an adhesive layer, and wherein each of the second major surface of the first glass substrate and the first major surface of the second glass substrate is a treated or untreated surface, wherein the treated surface comprises a silane coupling agent-treated surface, and wherein the multi-layer article is optically clear and does not show scattering of reflected light by the first optical film.

2. The multi-layer article of claim 1, wherein the article further comprises:
   a second optical film with a first major surface and a second major surface; and
   a third glass substrate with a first major surface and a second major surface, wherein the second major surface of the second glass substrate is interfacially bonded to the first major surface of the second optical film, wherein the interfacial bond between the second glass substrate and the second optical film is free from an adhesive layer, and wherein the second major surface of the second optical film is interfacially bonded with the first major surface of the third glass substrate, wherein the interfacial bond between the second optical film and the third glass substrate is free from an adhesive layer, and wherein each of the second major surface of the second glass substrate and the first major surface of the third glass substrate is a treated or untreated surface, wherein the treated surface comprises a silane coupling agent-treated surface, and wherein the multi-layer article is optically clear and does not show scattering of reflected light by the optical films.

3. The multi-layer article of claim 1, wherein the article further comprises:
a second optical film with a first major surface and a second major surface;
a third optical film with a first major surface and a second major surface; and
a third glass substrate with a first major surface and a second major surface, wherein the second major surface of the second glass substrate is interfacially bonded to the first major surface of the second optical film, wherein the interfacial bond between the second glass substrate and the second optical film is free from an adhesive layer, and wherein the second major surface of the second optical film is interfacially bonded with the first major surface of the third optical film, wherein the interfacial bond between the second optical film and the third optical film is free from an adhesive layer, and wherein the second major surface of the third optical film is interfacially bonded to the first major surface of the third glass substrate, wherein each of the second major surface of the second glass substrate and the first major surface of the third glass substrate is a treated or untreated surface, wherein the treated surface comprises a silane coupling agent-treated surface, and wherein the multi-layer article is optically clear and does not show scattering of reflected light by the optical films.

4. The multi-layer article of claim 1, wherein the first optical film comprises a multi-layer polarizing film.

5. The multi-layer article of claim 4, wherein the multi-layer polarizing film comprises alternating layers of polyethylene terephthalate and polyethylene naphthalate.

6. The multi-layer article of claim 1, wherein each of the second major surface of the first glass substrate and the first major surface of the second glass substrate comprises a treated surface, wherein the treated surface comprises a treated surface treated with a silane coupling agent with the general structure:

wherein each Z is an alkyl or alkoxy group, with the proviso that at least one Z is an alkoxy group;
A is a divalent linking group comprising an alkylene, arylene, or aralkylene group; and
X is a functional group selected from an amino group —$NR^1_2$ where each $R^1$ independently is a hydrogen atom, an alkyl group, an aryl group, an isocyanate group or an epoxy group.

* * * * *